Oct. 22, 1963 D. L. JAFFE ETAL 3,108,222
SPECTRUM ANALYZER EMPLOYING VELOCITY MODULATION
Filed Aug. 30, 1960
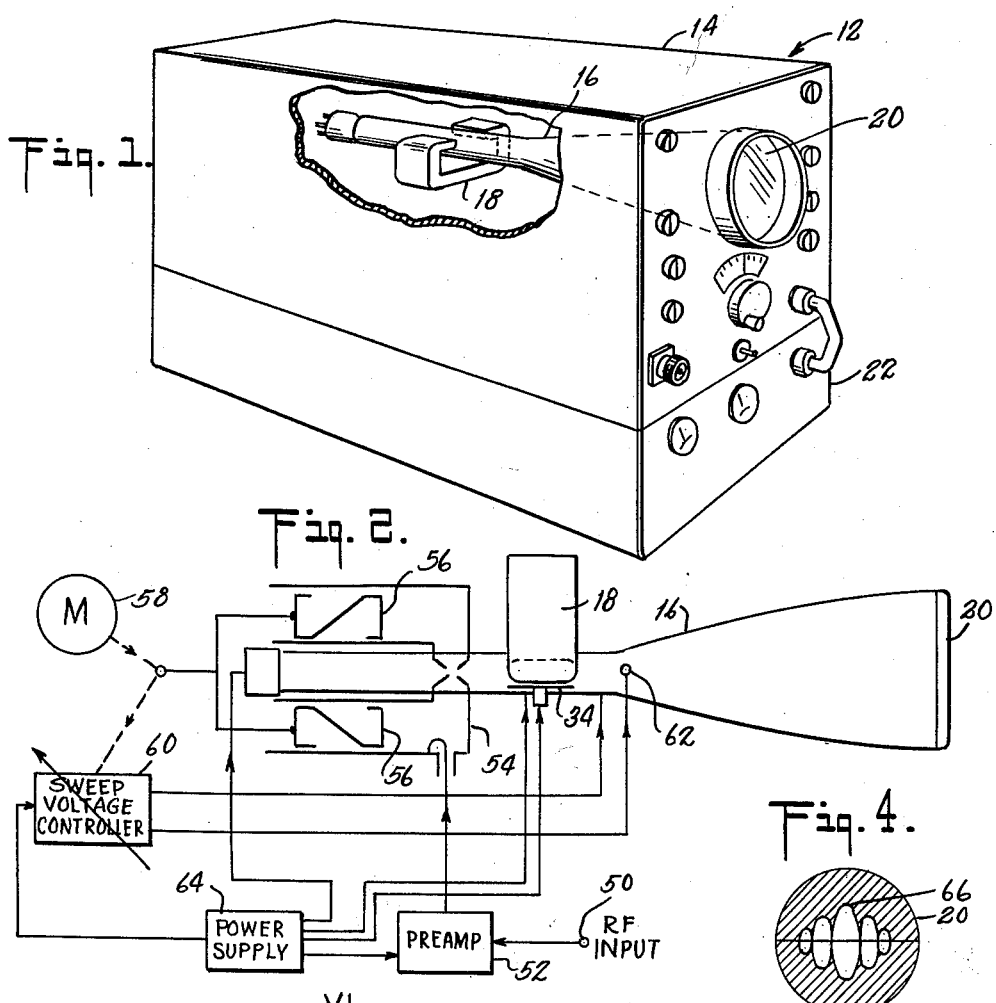
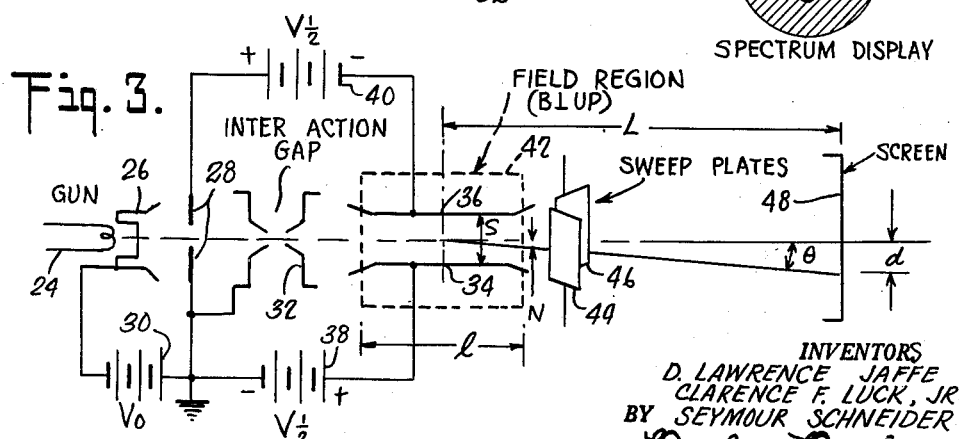
INVENTORS
D. LAWRENCE JAFFE
CLARENCE F. LUCK, JR.
BY SEYMOUR SCHNEIDER
Darby & Darby
ATTORNEYS United States Patent Office 3,108,222
Patented Oct. 22, 1963

3,108,222
SPECTRUM ANALYZER EMPLOYING
VELOCITY MODULATION
David Lawrence Jaffe, Great Neck, N.Y., Clarence F. Luck, Jr., Waltham, Mass., and Seymour Schneider, Bayside, N.Y., assignors to Polarad Electronics Corporation, Long Island, N.Y., a corporation of New York
Filed Aug. 30, 1960, Ser. No. 52,944
5 Claims. (Cl. 324—77)

The present invention relates to microwave spectrum analyzers wherein a velocity modulation cathode ray tube indicator is utilized and more particularly where such a tube of straight line configuration is used.

In conventional forms of spectrum analyzers presently in use, the spectrum is displayed on a conventional form of cathode ray tube, namely one in which the spot co-ordinants are correlated to respective vertical and horizontal deflection plate voltages. In this usual form of spectrum analyzer the spectrum display information must essentially be entirely derived by separate electrical circuitry and the cathode ray tube serves only to display this separately derived spectrum information. Typically, spectrum analyzer circuitry includes means for providing an acceptance band for electrical signals of limited frequency bandwidth and which may have its center frequency cyclically swept over a relatively wide frequency range. The electrical circuitry thus produces an output with an instantaneous amplitude related to the amplitude of the instantaneously scanned frequency component of the input signal.

The present invention provides a microwave spectrum analyzer wherein a substantial portion of the spectrum information derivation is performed by a special form of cathode ray tube structure utilizing a velocity modulated electron beam. The velocity modulated cathode ray tube structure also has a high degree of sensitivity and good response at high microwave frequencies. Thus the present invention provides a microwave spectrum analyzer in which the complexity of auxiliary electrical circuitry can be greatly reduced with the result that a more readily portable device may be provided, and it is quite feasible to provide a small portable battery operated apparatus.

In addition to the previously described features and advantages it is an object of the present invention to provide a microwave spectrum analyzer utilizing a velocity modulation cathode ray tube.

It is a further object of the present invention to provide a velocity modulation spectrum analyzer wherein the velocity modulation structure of the cathode ray tube is tunable to provide a swept frequency acceptance band for the cathode ray tube.

It is still another object of the present invention to provide a velocity modulation spectrum analyzer utilizing a velocity modulation cathode ray tube of straight line configuration and having normally balanced, crossed electric and magnetic fields for producing angular deviations of the electron beam correlated to the instantaneous electron velocity modulation.

Other objects and advantages will be apparent from a consideration of the following description in conjunction with the appended drawings in which:

FIGURE 1 is an isometric view of a velocity modulation spectrum analyzer according to the present invention partially cut away to show the location of the velocity modulation cathode ray tube in the apparatus;

FIGURE 2 is a simplified block diagram of the microwave electrical circuit of the apparatus of FIGURE 1;

FIGURE 3 is a schematic diagram of the velocity modulation cathode ray tube of FIGURES 1 and 2; and FIGURE 4 is a plan view of a typical spectrum display as might be produced by the apparatus of the present invention.

Microwave spectrum analyzer apparatus 12 is shown in FIGURE 1 having an exterior housing 14. The apparatus contains a velocity modulated cathode ray tube 16 provided with a permanent magnet 18, the construction and operation of which will be described in greater detail herein below. The face 20 of the velocity modulated cathode ray tube 16, is located in an opening in the housing 14 for observation by the operator of the apparatus.

One advantage of apparatus according to the present invention is that it lends itself to operation from a portable electrical supply such as dry cells or storage batteries. The apparatus may be arranged so that the power supply 22 occupies a separable lower portion of the apparatus as shown in FIGURE 1.

Analyzers as hereinafter described may be designed for various specific frequency ranges in the radio frequency spectrum, for example L-band (1–2 kmc.), S-band (2–4 kmc.), C-band (4–8 kmc.), X-band (8–11 kmc.), or other higher or lower frequency ranges. The particular example of apparatus herein described is designed for X-band operation.

Since an understanding of the construction and operation of the velocity modulated cathode ray tube portion of the apparatus is essential to an understanding of its overall operation, this portion of the apparatus will be explained as a preliminary. The details of the velocity modulated cathode ray tube are not shown in FIGURE 1 and may be best understood by reference to FIGURE 3. FIGURE 3 shows in schematic form the construction of the cathode ray tube 16 as it would be viewed from the side in FIGURE 1; that is, the magnetic field of magnet 18 may be considered to extend perpendicular to the paper in FIGURE 3, and for the purposes of explanation to be considered to extend upwardly in FIGURE 3, as noted.

In FIGURE 3 there is shown an electron beam gun indicated schematically and including cathode 26 and heater 24. An accelerator electrode 28 is shown which accelerates the electron beam to a predetermined desired velocity. The electron beam passes from the cathode 26 through electrode 28 and through the interaction gap 32 of a coaxial resonator 54. The coaxial resonator 54 (not shown in FIGURE 3) may be of the form conventionally utilized with electron tubes of the external cavity Klystron type. The electron beam gun may be of the type used in conventional cathode ray tubes.

As shown in FIGURE 3, the cathode 26 may be maintained at a suitable negative potential with respect to electrode 28 and interaction gap 32 by D.C. voltage supply 30.

In passing through the interaction gap 32 the electron beam will be velocity modulated by any signal present at the interaction gap 32. This phenomenon is well known in Klystron electron tubes and other forms of velocity modulated electron tubes. The phenomenon may be briefly explained by stating that during a portion of a cycle of a signal supplied to the interaction gap 32 there will be an electrical field in the interaction gap which tends to slow down electrons passing through the gap at that instant of time. At other times the electrical field will be such as to speed up electrons instantaneously in the interaction gap. Thus the velocity distribution of electrons in the beam is substantially broadened by a signal at the interaction gap.

The electron beam passes from the interaction gap 32 to the field region 42 indicated in dotted lines wherein a substantially homogeneous and constant magnetic field is maintained by the permanent magnet 18 (not shown in FIG. 3). In this same region conductive plates 34 and 36 are arranged and supplied with a voltage to produce an electrical field which is substantially homogeneous and unidirectional in the field region 42 and is at right angles to the magnetic field. High voltage power sources 38 and 40 are connected to plates 34 and 36 in an appropriate manner to produce the desired field. Slight adjustments of this voltage may be utilized for vertical positioning control.

The strengths of the electric and magnetic fields may readily be calculated so that for electrons of average velocity ejected by the electron gun the deflecting forces due to the electric and magnetic fields respectively will be equal and opposite and thus a beam of such average velocity will pass straight through the apparatus to the center of the screen 48, or alternatively to a base line not at the center of the screen.

As is well known, the deflection produced by a magnetic field is dependent upon the electron beam velocity while the deflection produced by an electric field is not so dependent (except as it affects the time the electron is subject to the field). Thus electrons of less than average velocity will be less strongly deflected by the magnetic field and thus will be deflected downward towards plate 34 in FIGURE 3. Electrons of greater than average velocity will conversely be more strongly deflected by the magnetic field and thus will be deflected upwards toward plate 36 in FIGURE 3.

Sweep deflection plates 44 and 46 are provided for deflecting the beam at right angles to the direction of deflection produced by the electric and magnetic fields, that is, in a direction perpendicular to the paper in FIGURE 3, either up or down. If desired, a brighter image may be provided by addition of a post acceleration voltage electrode with a voltage of 50 volts or more with respect to the accelerator electrode 28.

FIGURE 2 shows in schematic form the spectrum analyzer apparatus. The radio frequency signal to be analyzed is supplied to the RF input 50 from whence it is conducted to a preamplifier 52. The preamplifier may take the form of a traveling wave tube amplifier or two or more traveling wave tube amplifier stages if desired. Obviously, the input signal could alternatively be reduced in frequency by a frequency conversion stage to an intermediate frequency before being supplied to the velocity modulated cathode ray tube.

The signal from preamplifier 52 is supplied to coaxial transmission line resonator 54 which is provided with non-contacting short circuit elements 56 which are physically adjustable to change the resonant frequency of the resonator 54.

The resonator 54 is cyclically tuned through a predetermined frequency range by motor 58 (at 15 cycles per second, for example) which also drives sweep voltage controller 60 in synchronism therewith. The output from sweep voltage controller 60 is supplied to terminals 62 of sweep plates 44 and 46. The power supply 64 which may be of conventional type supplies the various voltages and currents required by the elements of the circuit. As previously mentioned, the relatively low current requirements of such a system make it possible to utilize a portable battery powered transiterized high voltage powered supply for the apparatus.

From the description of FIGURE 2 it will be seen that the coaxial resonator 54 causes the velocity modulated cathode ray tube 16 to effectively be responsive only to the relatively narrow frequency range to which the cavity resonator 54 is instantaneously tuned. A signal is displayed on the face 20 of the cathode ray tube wherein the maximum deflection of the beam on the face 20 in a vertical direction corresponds to the degree of velocity modulation and hence to the amplitude of the signal within the limited frequency range accepted by the cavity resonator 54.

The motor 58 tunes the resonator 54 to sweep this acceptance band through a predetermined range of frequencies and at the same time the sweep voltage controller 60 sweeps the electron beam to the right and left across the face 20 of tube 16 generating a display of amplitude versus frequency corresponding to the frequency distribution of the input signal. A characteristic spectrum display 66 is shown in FIGURE 4.

It will be understood that many optional features, such as frequency marker circuits and the like, commonly incorporated in spectrum analyzer apparatus have not been shown, but may readily be added to the apparatus shown in manners obvious to those of skill in the art.

In order that the theory of operation of the device may be more fully explained to those of skill in the art, an analysis of small signal performance is presented. For zero voltage across the interaction gap, the beam travels along the center line of the tube. With the forces due to the electric field and the magnetic field balanced, $$F_B = F_E \tag{1}$$

$$evB = eV_1/s \tag{2}$$

where $F_B$ is the magnetic field force, $F_E$ is the electric field force, $e$ is the electron charge, $v$ is the electron velocity, B is the magnetic field strength, $V_1$ is the electric field voltage, and $V_1/s$ is the electric field voltage gradient:

From Equation 2 the relation $B = V_1/sv$ will be found useful. Keeping $V_1$ and B constant, a slight change $\Delta v$ in electron velocity due to a signal of the proper frequency present at the interaction gap will result in a transverse force on the electron, $$F = e\Delta vB \tag{3}$$

The acceleration due to this force is $a$, $$a = e\Delta vB/m \tag{4}$$

where $m$ is the electron mass.

Since this force acts as long as the electron is in the field region, it produces a displacement $z$ from the center line at the exit edge of the field region, $$z = \tfrac{1}{2}at^2 = e\Delta vB/2m(l/v+\Delta v)^2 \tag{5}$$

It is convenient to eliminate B, $$z = e\Delta vV_1l^2/2sv^3m \tag{6}$$

Terms in the denominator involving $\Delta v$ which is very small compared to $v$ having been eliminated. Making certain geometrical approximations from similar triangles, $$2z/l = d/L \tag{7}$$

so that $$d = 2zL/l \tag{8}$$

and substituting for $z$ from Equation 6, $$d = (eV_1lL/sm)(\Delta v/v^3) \tag{9}$$

But, from conservation of energy, $$v = (2eV_0/m)^{1/2} \tag{10}$$

differentiating with respect to incremental changes in $V_0$, the beam voltage, $$\Delta v = \left(\frac{e}{2m}\right)^{1/2}\left(\frac{E}{V_0^{1/2}}\right) \tag{11}$$

where the signal voltage E represents the incremental change $\Delta V_0$.

Therefore, substituting Equations 10 and 11 in Equation 9, $$d = V_1lLE/4sV_0^2 \tag{12}$$

Thus the deflection can be made very large by making $V_1$ very large. This is possible since the condition on $V_1$ is only that its ratio with B be held constant for a particular $V_0$, $$\frac{V_1}{B} = s(2eV_0/m)^{1/2} \tag{13}$$

as derived from Equations 2 and 10.

As an example consider a tube with the following parameters:

$l = 3$ centimeters (14)
$L = 15$ centimeters (15)
$s = 0.1$ centimeter (16)
$V_0 = 1000$ v. (17)
$V_1 = 1200$ v. (18)

Substitution in Equation 12 yields:

$$d = 0.135E \quad (19)$$

The electron beam will probably have a thermal velocity spread of not more than about 1.0 volt will thus cause a spot spread of not more than about 0.135 centimeter. For these parameters then, the "thermal noise" in the beam limits the minimum detectable signal to about 1.0 volt since a spot approximately 0.1 centimeter in diameter may be considered practical for C.R.T.'s in general.

A relation for calculating B can be derived from Equation 13, $$B = V_1 m^{1/2} / s(2eV_0)^{1/2} \quad (20)$$

Inserting values and constants for unit conversion, $$B = 1.68 V_1 / s V_0^{1/2} \text{ gauss} \quad (21)$$

From our example, $V_1 = 1200$, $s = 0.1$, $V_0 1000$ $$B = 639 \text{ gauss} \quad (22)$$

which is easily obtained with a moderate sized permanent magnet.

Transit time effects in the interaction gap will not present a problem for usual frequencies and gap configurations. Serious loss of sensitivity would not be expected for transit angles which did not exceed 90°.

Very good sensitivity is realized by using two traveling wave tubes in series in amplifier 52. The first stage may comprise a Huggins HA-23 low noise traveling wave amplifier. This tube has a 10 db noise figure and 25 db gain. The second may comprise a Huggins HA-4 traveling wave amplifier with a noise figure of 25 db and a gain of 30 db. Assume the inputs and outputs of the traveling wave tubes to be matched to 50 ohms. A resonator Q of 500, which is reasonably typical, corresponds to a bandwidth of approximately 20 mc. in X-band. The first tube input noise power at 30 degrees C is $3.2 \times 10^{-15}$ watts. The output after 25 db gain is $1 \times 10^{-8}$ watts. The noise input power developed by the second tube alone is $1 \times 10^{-9}$ watts. Therefore, the noise figure will be essentially that of the first tube, 10 db or $3.2 \times 10^{-15}$ watts sensitivity. This corresponds to −95 dbm. The total noise output power from both tubes is $1 \times 10^{-5}$ watts, which is due to the first tube input noise.

Since the cavity performs the function of impedance transformation as well as frequency selection the power required to produce 1 volt (min. signal as calculated above, across $13.5 \times 10^4$ ohms typical cavity shunt impedance) is $7.4 \times 10^{-6}$ watts. Therefore, these two traveling wave tubes produce visible noise on the M.C.R.T. screen with a net system sensitivity of 3,200 micro-micro-watts with a 20 mc. bandwidth at X-band.

From the foregoing explanation and description it will be seen that spectrum analyzer apparatus is provided by the present invention of remarkable simplicity but with excellent sensitivity and further that, by reducing the number of circuits required, the current requirement is substantially reduced and battery powered operation is feasible.

It will be understood that, in addition to the variations to the specific embodiment suggested, numerous other variations and modifications will be apparent to those skilled in the art, and accordingly, the scope of the invention is not to be construed to be limited to the particular forms shown or suggested, but is to be limited solely by the appended claims.

What is claimed is:

1. Microwave spectrum analyzer apparatus comprising a cathode ray tube envelope, an electron beam gun in said envelope, a velocity modulation structure arranged to velocity modulate the beam from said gun in accordance with an input signal, means for limiting the frequency bandwidth of the signal modulating said beam to a relatively narrow band of frequencies selected from the relatively wider range of operating frequencies of said apparatus, means for producing a substantially unidirectional electric field in a first direction across said velocity modulatable beam, means for producing a substantially unidirectional magnetic field across said velocity modulatable beam substantially perpendicular to said electric field, the magnitudes of said electric and magnetic fields being related to produce substantially equal and opposite deflecting forces on said beam at its non-modulated velocity but to produce substantial unbalanced deflection forces for velocities departing from said non-modulated velocity, means for independently deflecting said beam in response to a deflection signal in a direction perpendicular to said electric field forces, means for supplying a radio frequency signal to be analyzed to said velocity modulation structure, means for tuning said bandwidth limiting means through a range of frequencies with respect to which said radio frequency signal is to be analyzed, and means for providing a deflection signal to the last said deflecting means.

2. Microwave spectrum analyser apparatus comprising a cathode ray tube envelope, an electron beam gun in said envelope, a velocity modulation structure arranged to velocity modulate the beam from said gun in accordance with an input signal, means for limiting the frequency bandwidth of the signal modulating said beam to a relatively narrow band of frequencies selected from the relatively wider range of operating frequencies of said apparatus, means for producing a substantially homogeneous unidirectional electric field in a first direction across said velocity modulatable beam, means for producing a substantially constant homogeneous unidirectional magnetic field across said velocity modulatable beam substantially perpendicular to said electric field, the magnitudes of said electric and magnetic fields being related to produce substantially equal and opposite deflecting forces on said beam at its non-modulated velocity but to produce substantial unbalanced deflection forces for velocities departing from said non-modulated velocity, means for independently deflecting said beam in response to a deflection signal in a direction perpendicular to said electric field forces, means for supplying a radio frequency signal to be analyzed to said velocity modulation structure, means for tuning said bandwidth limiting means through a range of frequencies with respect to which said radio frequency signal is to be analyzed, and means for providing a deflection signal correlated with said tuning of said bandwidth limiting means to the last said deflecting means.

3. Microwave spectrum analyzer apparatus comprising a cathode ray tube envelope, an electron beam gun in said envelope, a velocity modulation structure arranged to velocity modulate the beam from said gun in accordance with an input signal, means for limiting the frequency bandwidth of the signal modulating said beam to a relatively narrow band of frequencies selected from the relatively wider range of operating frequencies of said apparatus, means for producing a substantially homogeneous unidirectional electric field in a first direction across said velocity modulatable beam, means for producing a substantially constant homogeneous unidirectional magnetic field across said velocity modulatable beam substantially perpendicular to said electric field, the magnitudes of said electric and magnetic fields being related to produce substantially equal and opposite deflecting forces on said beam at its non-modulated velocity but to produce substantial unbalanced deflection forces for velocities departing from said non-modulated velocity means for independently deflecting said beam in response to a deflection signal in a direction perpendicular to said electric field forces, means for supplying a radio frequency signal to be analyzed to said velocity modulation structure, means for cyclically tuning said bandwidth limiting means through a range of frequencies with respect to which said radio frequency signal is to be analyzed, and means for providing a deflection signal correlated with said cyclical tuning of said bandwidth limiting means to the last said deflecting means.

4. Microwave spectrum analyzer apparatus comprising a velocity modulation cathode ray tube including an electron beam gun, a velocity modulation structure including a coaxial transmission line resonator and an interaction gap arranged to velocity modulate the beam from said gun in accordance with an input signal, said resonator being tunable to selectively respond to a narrow band of frequencies selected from the relatively wider range of operating frequencies of said apparatus, means for producing a substantially homogeneous unidirectional electric field in a first direction substantially perpendicular to the direction of propagation of said velocity modulatable beam, a permanent magnet producing a substantially constant homogeneous unidirectional magnetic field substantially perpendicular to said electric field and to the direction of progagation of said velocity modulatable beam, the magnitudes of said electric and magnetic fields being related to produce substantially equal and opposite deflecting forces on said beam at its non-modulated velocity but to produce substantial unbalanced deflection forces for velocities departing from said non-modulated velocity, and deflection plates for independently deflecting said beam in a direction perpendicular to said electric field forces in response to a deflection signal; means for supplying a radio frequency signal to be analyzed to said velocity modulation structure; means for cyclically tuning said velocity modulation structure through a range of frequencies with respect to which said radio frequency signal is to be analyzed; and means for providing a deflection signal correlated with said cyclical tuning of said velocity modulation structure to the last said deflecting means.

5. Microwave spectrum analyzer apparatus comprising a cathode ray tube envelope having a fluorescent screen, an electron beam gun in said envelope directed toward the center of said screen, a velocity modulation structure comprising an interaction gap adjacent the beam and arranged to velocity modulate the beam from said gun in accordance with an input signal, means for limiting the frequency bandwidth of the signal modulating said beam to a relatively narrow band of frequencies selected from the relatively wider range of operating frequencies of said apparatus comprising a tunable coaxial transmission line resonator coupled to said interaction gap, means for producing a substantially homogeneous unidirectional electric field in a first direction across said velocity modulatable beam, a permanent magnet producing a substantially constant homogeneous unidirectional magnetic field across said velocity modulatable beam substantially perpendicular to said electric field, the magnitudes of said electric and magnetic fields being related to produce substantially equal and opposite deflecting forces on said beam at its non-modulated velocity but to produce substantial unbalanced deflection forces for velocities departing from said non-modulated velocity, means for independently deflecting said beam in a direction perpendicular to said electric field forces in response to a deflection signal, means for supplying a radio frequency signal to be analyzed to said velocity modulation structure, motive means for cyclically tuning said resonator through a range of frequencies with respect to which said radio frequency signal is to be analyzed, and means for providing a deflection signal to the last said deflecting means correlated with said cyclical tuning of said resonator.

References Cited in the file of this patent

UNITED STATES PATENTS

| | | |
|---|---|---|
| 2,306,875 | Fremlin | Dec. 29, 1942 |
| 2,309,966 | Litton | Feb. 2, 1943 |
| 2,380,791 | Rosencrans | July 31, 1945 |
| 2,473,426 | Halpern | June 14, 1949 |
| 2,479,222 | Ellen | Aug. 16, 1949 |
| 2,496,535 | Hoglund et al. | Feb. 7, 1950 |
| 2,530,373 | Bowen | Nov. 21, 1950 |
| 2,598,301 | Rajchman | May 27, 1952 |
| 2,830,224 | Jenny | Apr. 8, 1958 |
| 2,831,147 | Weber | Apr. 15, 1958 |
| 2,843,733 | Harrison | July 15, 1958 |

FOREIGN PATENTS

| | | |
|---|---|---|
| 787,271 | Great Britain | Dec. 4, 1957 |